United States Patent [19]
Gut

[11] Patent Number: 5,515,035
[45] Date of Patent: May 7, 1996

[54] METHOD AND EQUIPMENT FOR BIDIRECTIONAL DATA TRANSMISSION (PROTOCOL).

[75] Inventor: Max B. Gut, Weggis, Switzerland

[73] Assignee: Royale Consultants Ltd., Dublin, Ireland

[21] Appl. No.: 186,447

[22] Filed: Jan. 24, 1994

[30] Foreign Application Priority Data

Jan. 26, 1993 [CH] Switzerland ............. 00221/93

[51] Int. Cl.$^6$ ................................. H04J 14/08
[52] U.S. Cl. ............ 340/825.5; 370/85.3; 359/136
[58] Field of Search .......... 340/825.07, 825.06, 340/825.5; 370/31, 85.2, 85.3, 93, 24, 29; 371/34, 67.1; 359/113, 136

[56] References Cited

U.S. PATENT DOCUMENTS

| | | | |
|---|---|---|---|
| 5,121,382 | 6/1992 | Yang et al. | 370/31 |
| 5,164,942 | 11/1992 | Kamerman et al. | 370/85.2 |
| 5,276,703 | 1/1994 | Budin et al. | 370/85.2 |
| 5,295,154 | 3/1994 | Meier et al. | 370/95.1 |
| 5,311,114 | 5/1994 | Sambamurthy et al. | 370/85.3 |

*Primary Examiner*—Michael Horabik

[57] ABSTRACT

With this method, a CSMA/CA protocol can be used for the transmission of data by means of infra-red light or radio (or other non-hard-wired transmission media). For this purpose a communicator that has a transmit requirement and has not yet received a bit identifies itself as an initiating communicator, and one that has no transmit requirement but has received a bit identifies itself as a receiving communicator. At the start of data transmission the initiating communicator sends a double length start bit (D) representing its identity and then waits a defined time (tc), during which the receiving communicator sends back an echo in the form of a single length start bit (B). The initiating communicator waits after each bit transmitted for the echo and compares this on receipt with the transmitted bit, its transmission being interrupted after a mismatch. After the data transmission, and provided there is no further transmit requirement, the identities of initiating and receiving communicators are removed.

13 Claims, 8 Drawing Sheets

Signal element

METHOD AND EQUIPMENT FOR BIDIRECTIONAL DATA TRANSMISSION (PROTOCOL).

BACKGROUND TO THE INVENTION

The invention concerns a method and equipment for bidirectional data transfer, whereby the transmission is implemented using a protocol between devices that are partners in communication ("communicators") having both a transmitter and a receiver, and whereby the information is transmitted in serial bit form and the direction of the data streams is switchable.

By means of such a method, data transmission can be implemented between communicators - such as computers and printers - or other intelligent electronic systems which are not connected by cable, with infra-red light or radio used as the transmission medium. Methods such as this can also be used in connection with communication networks, whereby information can be exchanged between communicators which are connected by cable within a network and those which are not connected to the network by cable.

For communication in networks with several participants, the network must be self-administrating, i.e. it must be established which participants can communicate with each other at which points in time and under which criteria. The entire set of rules and conventions for network administration and the automatic implementation of an orderly information exchange between communicators make up the protocol. For complex network administration the protocol is based on a decentralised administration, in which every participant can be "Master" and undertakes part of the administration task. It is established with the protocol how a participant is to use and then release the network.

Known protocols for such networks are the CSMA/CD protocol (carrier sense, multiple access/collision detection, e.g. Ethernet) and the CSMA/CA protocol (carrier sense, multiple access/collision avoidance). The principle difference lies in that for the CSMA/CD protocol, during conflicts, each communicator suspends its transmission, and only begins a new attempt to access the network (bus) after a certain wait time. In this way, a period of waiting results, during which no exchange of information takes place. For CSMA/CA protocols on the other hand there is no such wait time. The network loading is therefore less efficient for the CSMA/CD protocol compared to the CSMA/CA protocol.

For any CSMA protocol to be realised the following conditions must be fulfilled:

Master capability: each participant must be able to take control of the transmission medium independently, based on its transmission requirements.

Listening ability: each participant must be able to observe the traffic on the network and use this as a criterion for the take-over of the network. A characteristic of a network with electrical connections and with a bus structure is the fact that all bus participants can listen to each data on the bus quasi-simultaneously (e.g. through "wired-or" output stages).

Ability to interrupt: each participant must be able to establish whether, during use of the network, another participant is similarly using the network, so that in such a case it can immediately cease its transmission.

Bidirectionality: the transmission medium must be capable of transmitting information bidirectionally.

Simultaneousness: transmission medium and communicators must be arranged in such a way that the simultaneous use of the transmission channel by several communicators is possible. This means, amongst other things, that for an electrically connected network with a bus structure, the use of push-pull output stages is not possible.

The above conditions imply that the participants must remain able to receive during transmission. For this reason CSMA/CA protocols have until now been used only in base-band transmission techniques.

The use of CSMA protocols is therefore not possible if, because of the transmission medium or method, a communicator cannot simultaneously listen to what other communicators are sending whilst itself transmitting data. Radio channels are an example of this, whereby other stations cannot be heard during transmission because of the extreme variations in field strengths. Another example are transmission systems based on fibre optics, in which the information is only transmitted unidirectionally because of the space multiplexing method used.

Another known method, in which data are transmitted using infrared light, uses a half-duplex method, whereby the data is sent in the form of data packets. Here also, a CSMA protocol cannot be used, as the aforementioned condition of simultaneous listening and sending is not fulfilled. With the abandonment of the use of such a protocol, the efficiency of the data transmission, and the time behaviour, deteriorate, in that (for example) long wait times result between a transmit requirement arising and the start of the actual data transmission.

SUMMARY OF THE INVENTION

It is therefore an object of the invention to propose a method and equipment for the implementation, in a method of the abovementioned type, of a CSMA/CA protocol to be used for data transmission.

According to this invention's method, a communicator that has a transmit requirement and has not yet received a bit identifies itself as an initiating communicator, and similarly one that has no transmit requirement but has received a bit identifies itself as a receiving communicator. At the beginning of data transmission, the initiating communicator sends a double length start bit which conveys its identity, and then waits a certain time during which the receiving communicator sends back an echo in the form of a single length start bit. The initiating communicator waits, after each bit sent, for an echo and compares this on receipt with the transmitted bit. If the two are not equal, transmission is terminated. After the end of the data transmission, provided there is no further need to transmit data, the identities of initiating and receiving communicator are removed.

The advantages achieved with the invention are seen to be that CSMA protocols can be used with transmission media which do not allow simultaneous listening during transmission. By means of this, extensions can be made to existing hard-wired networks that operate with a CSMA protocol, using non-contact transmission media, whereby transmission characteristics similar to the hard-wired network can be achieved. Further, the wait time at the start of transmission can be drastically reduced, which is of great benefit particularly for transmission systems in which real time behaviour is required. Thanks to the extension to the signal alphabet, the transmitting communicator can be characterized simply using the double length start bit. As a result, the following benefits are also possible:

increase in the actual Baud rate through the transmission of two bits in the original signal element;

increase in the redundancy of the data transmission through double bit representation;

introduction of a direct service channel, e.g. for the transmission of the control signals "Clear to send" (CTS) and "Request to send" (RTS) with RS 232 links and modem applications;

reduction in the energy requirements through the omission of transmission of the logic "O" value.

The invention will be explained below in more detail using a particular embodiment as example in conjunction with the drawings.

DETAILED DESCRIPTION OF PREFERRED EMBODIMENTS

Figure 1:
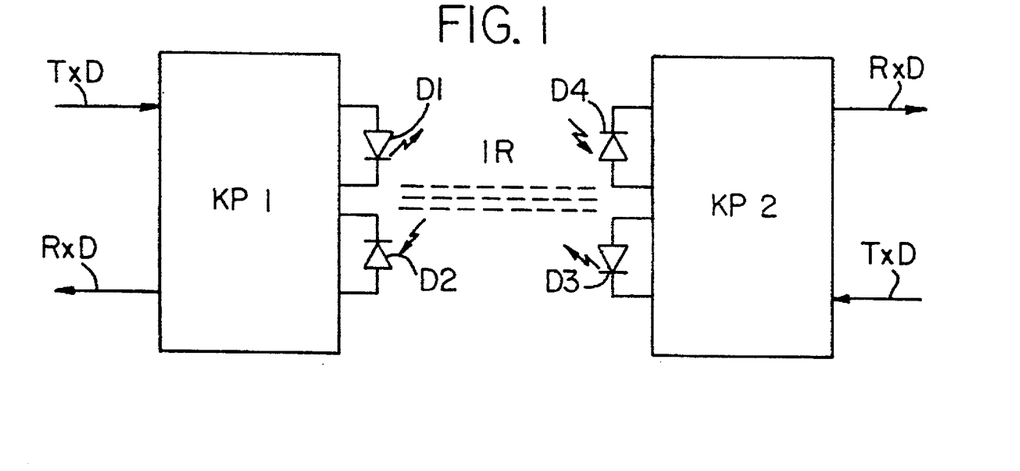
FIG. 1 is an outline drawing of an equipment according to the invention, with two communicators.
Figure 2:
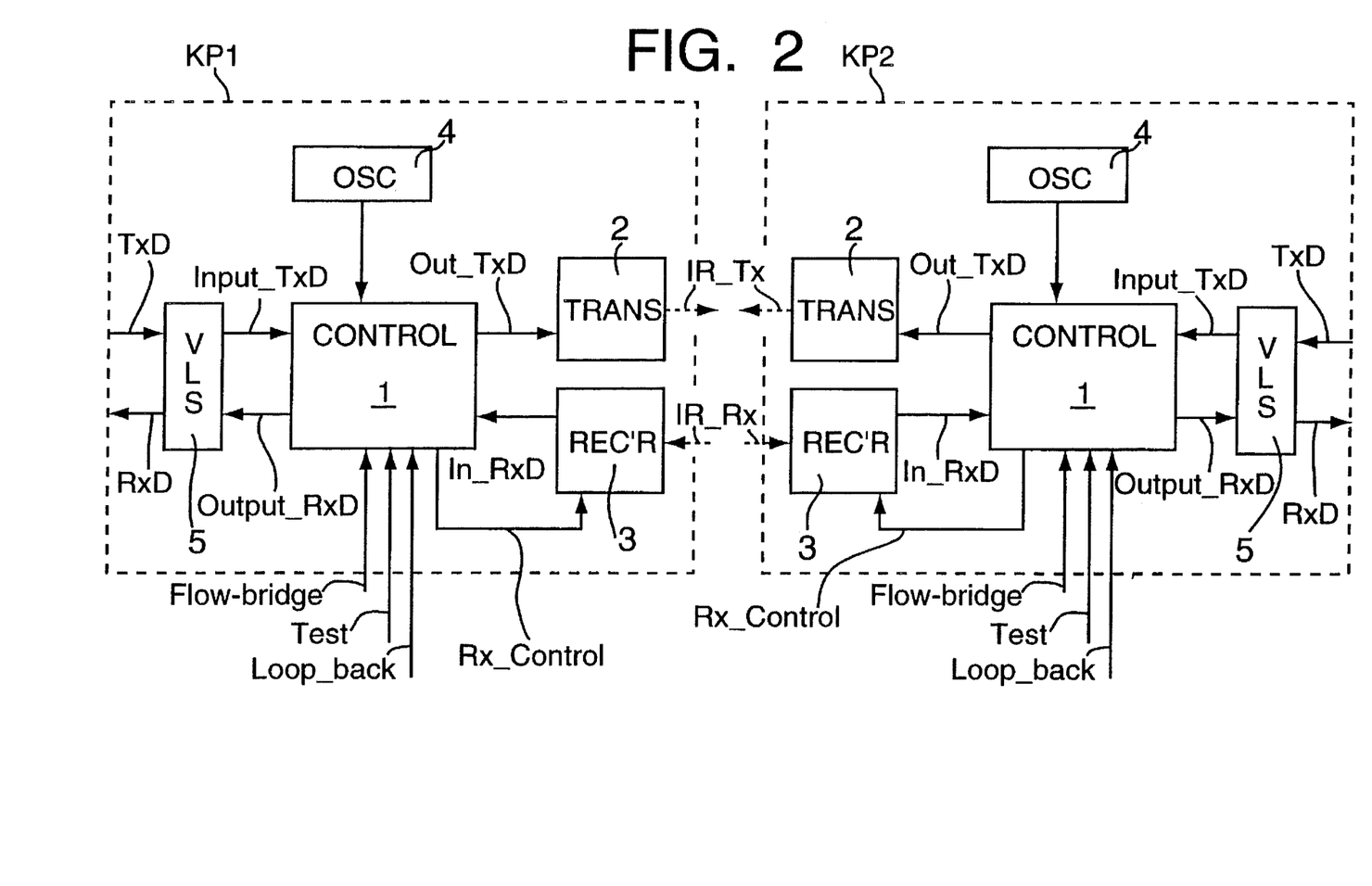
FIG. 2 shows block diagrams of the communicators in the equipment of FIG. 1.

In FIG. 1 communicators (such as computers or other intelligent electronic systems) are labelled KP1 and KP2. The communicators KP1 and KP2 are each fitted with a transmitter 2 and a receiver 3 (FIG. 2). For the purpose of data transmission by infra-red (IR) light, the transmitter has light emitting diodes D1, D3 and the receiver has photo-diodes D2, D4. The data to be sent is brought in via lines or signals TxD, and the received data is passed on via lines or signals RxD.

As shown in FIG. 2 each communicator KP1, KP2 has a control unit 1, which is connected to the transmitter 2 with a line Out_TxD and to the receiver 3 with a line In_RxD. An oscillator 4 is connected to the control unit 1, and generates a clock signal with a typical frequency of 5.0688 MHz. The control unit 1 is connected to a voltage level shifter 5 via lines Input_TxD and Output_RxD. The voltage level shifter 5 receives the data to be transmitted via line TxD, and outputs the received data via line RxD. The data to be transmitted (sent and received) by infra-red light is indicated by dashed arrows IR_Tx and IR_Rx respectively. The receiver 3 is connected to the control unit 1 by a further line Rx_Control. Three inputs to the control unit 1 are marked Flow bridge, Test and Loop_back, with which various operating modes (described in more detail below) can be activated.

Figure 3:
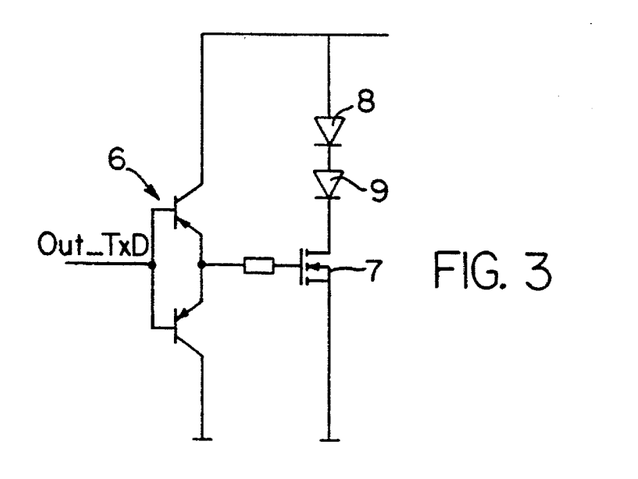
FIG. 3 is a circuit diagram of an infra-red transmitter for the equipment.

The transmitter 2 (shown in FIG. 3) contains a driver stage 6, a power FET 7 connected after the driver stage and two LEDs 8 and 9 in the output circuit. Via line Out_TxD, connected at the input, digital signals are brought from the control unit 1 to the transmitter 2, whereby bursts of oscillations with a frequency of 460.8 kHz for example, are transmitted from the LEDs 8 and 9. The bursts form rectangular, modulated wave trains (outlined in FIG. 7).

Figure 4:
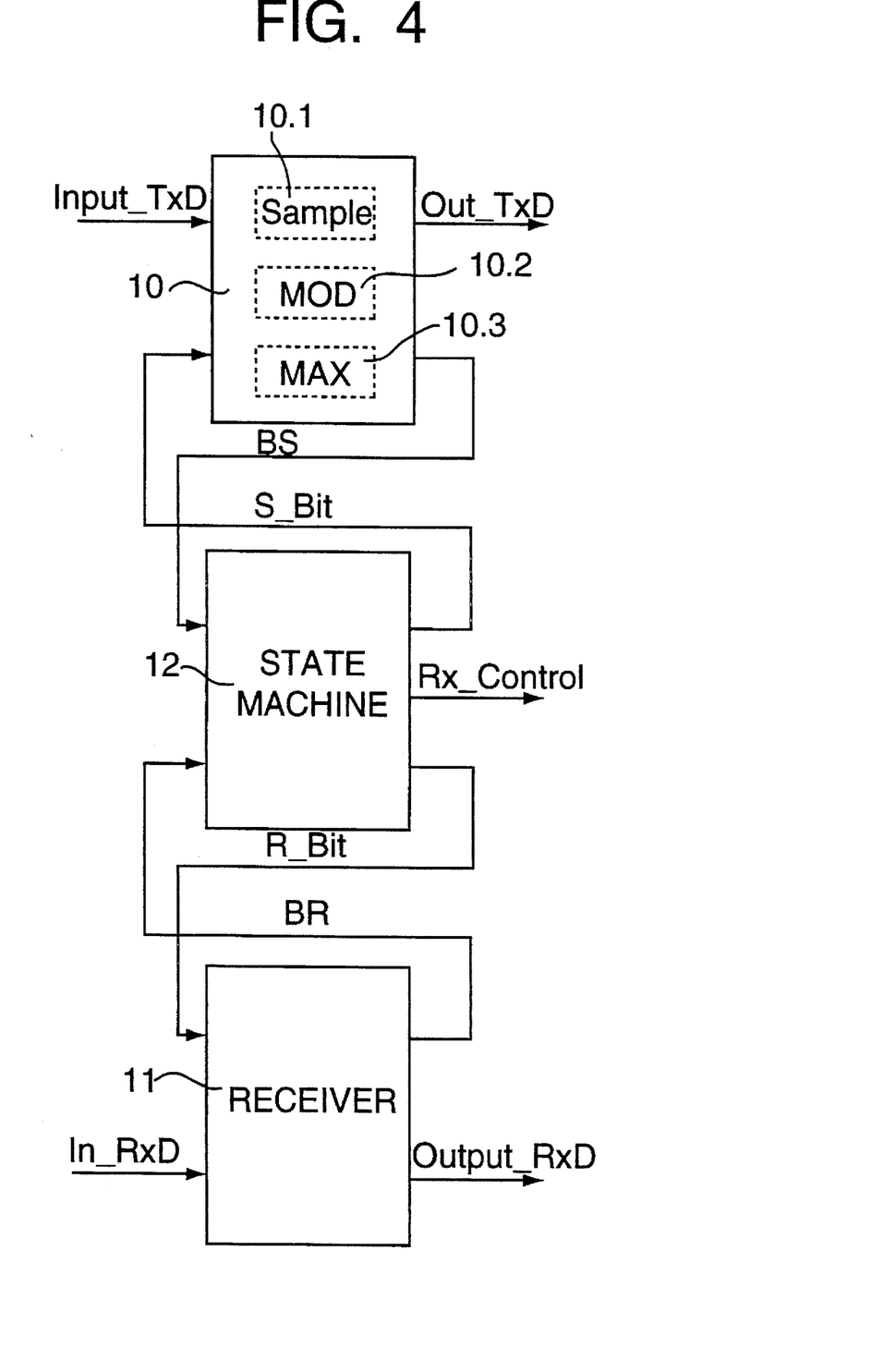
FIG. 4 is a block diagram of a control unit for the equipment.

As shown in FIG. 4, the control unit 1 contains a transmit part 10, a receive part 11 and a state machine 12. The parts 10 and 11 are connected to the state machine 12 via lines BS, S_Bit and BR, R_Bit respectively. The transmit part 10 and the receive part 11 perform transmission-related and reception-related tasks respectively and the state machine 12 coordinates the functions of both parts 10 and 11. The state machine also generates signals Rx_Control which are necessary for the control of the receiver 3. The transmit part has a modulator 10.2 and a multiplexer 10.3, which are explained in more detail below in the functional description.

Figure 5:
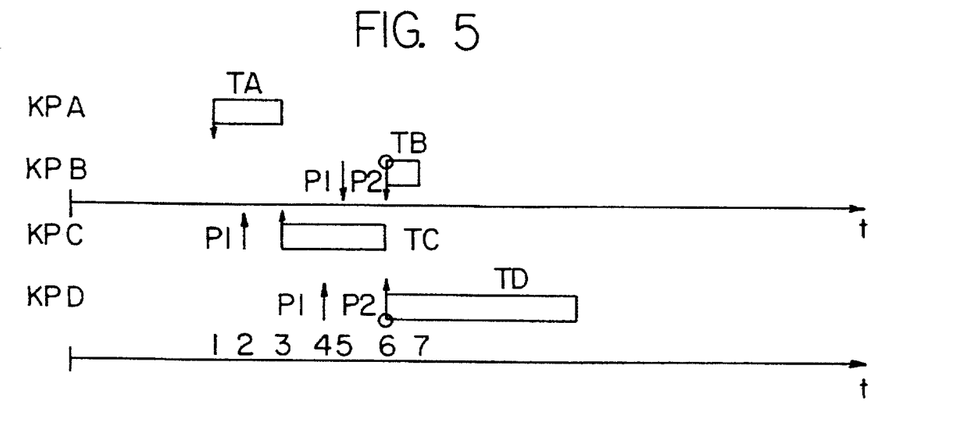
FIG. 5 is a diagram showing access by several communicators onto a communication network bus, following a CSMA/CA protocol.

The timing diagram of FIG. 5 shows data telegrams, marked TA, TB, TC and TD, which are broadcast from communicators KPA, KPB, KPC and KPD respectively that are connected over the bus (BU in FIG. 11) of a hard-wired network. Arrows P1 symbolise intention to access, while arrows P2 symbolise potential collisions, and numerals 1 to 7 represent potential access and collision time points. Below the method of operation of a CSMA/CA protocol is described with the aid of FIG. 5:

If KPA intends to transmit, it first listens to the bus and establishes whether it is already occupied by another communicator (time point 1). If it establishes that the bus is free, it sends its telegram TA. If another communicator (KPC) similarly intends to transmit a telegram TC during this time, it now determines that the bus is busy (time point 2). It therefore waits to transmit until the bus is again free at the end of telegram TA (time point 3).

If more than one communicator (KPD, KPB) now intend to transmit a telegram themselves during the transmission of a telegram (TC) by another communicator (KPC, time points 4 and 5), then their later attempts at access (which were originally blocked) are quasi-synchronised by the release of the bus: both communicators no longer "hear" anything on the bus and so begin to transmit their telegrams TB, TD simultaneously (time point 6). During the broadcast of their telegrams TB and TD, however, both communicators listen and check whether the data that they have transmitted corresponds to the data that they receive. As soon as the transmitted data no longer corresponds to the broadcast data, they terminate transmission immediately and try a repeated access only when they have established that the bus is again free (time point 7, KPB). If it is ensured through the network that several communicators can simultaneously transmit without failure (e.g. "wired-or" connection onto the electrical conductor), then one communicator (KPD, time point 7) cannot establish that other communicators (KPB, time period 6–7) have simultaneously sent the same data. It will therefore continue with transmission of the telegram unhindered. In this way KPD has de facto the higher priority over KPB. If the transmit side address is broadcast as the first part of a telegram, priority can be allocated and determined on the basis of bus member address.

Figure 6:
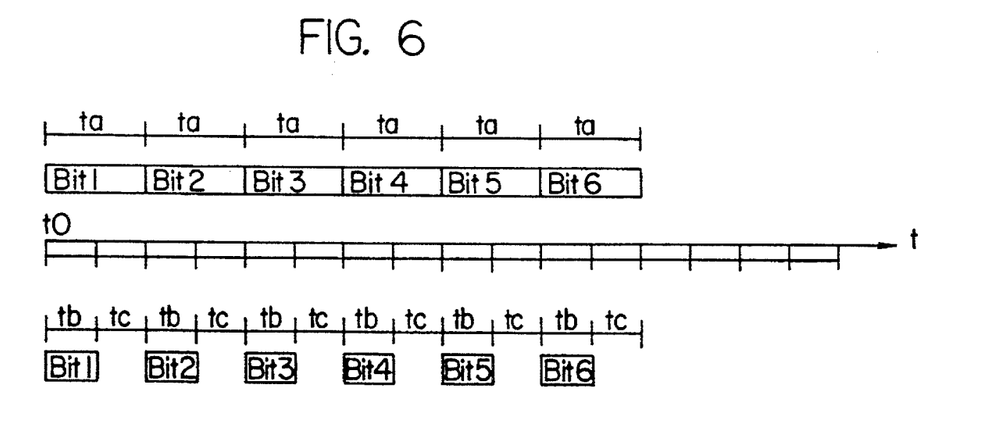
FIG. 6 are diagrams which show the time division between bits and "unused" time slices of a datastream to be transmitted.

The timing diagram in FIG. 6 illustrates the time distribution of bits used by the bit-serial method in question. As shown in FIG. 6, the time period ta between the beginning of successive bits of a datastream is split into two equal halves tb and tc. The bits are only transmitted during the first half tb, the second half tc representing unused time for this datastream. In this way it is possible that an initiating communicator can hear its echo (which is sent back by a receiving communicator in the second half tc) virtually simultaneously with the transmission of a bit, i.e. within the time period ta (see also FIG. 8). In the following description the term "signal element" will also be used for the time period ta.

Figure 7:
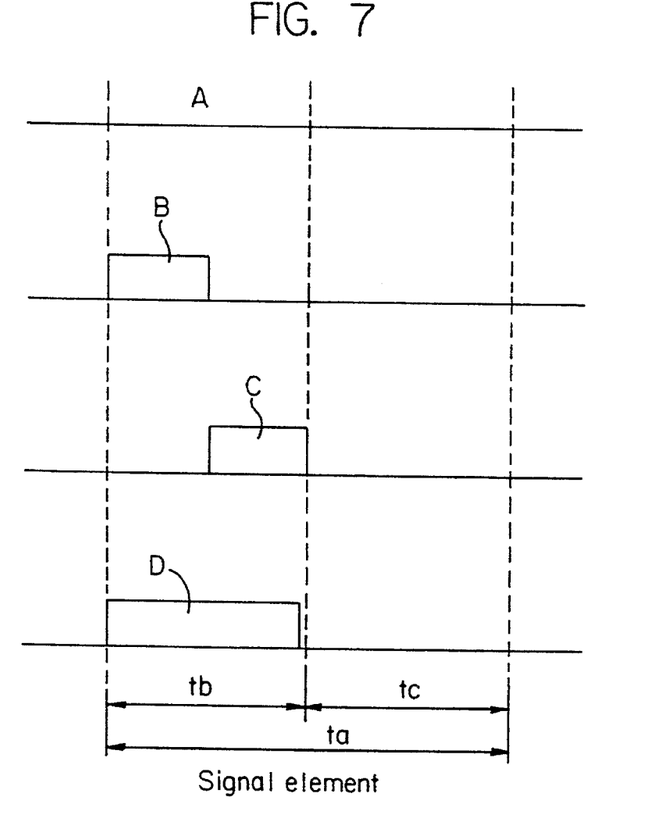
FIG. 7 is an impulse diagram of the bits of a datastream to be transmitted, which serves to represent an extended signal alphabet.

The basis of the impulse diagram shown in FIG. 7 is a combination of pulse-burst position modulation (PBPM) and pulse-burst width modulation (PBWM). With this combination an extension to the signal alphabet is achieved, insofar as the individual bits can convey four different meanings. The bits are transmitted in the form of impulses, which are formed from the envelope of the bursts of oscillations, whereby the broadcast of the bursts of oscillations is controlled by the modulator 10.2 in the transmit part 10 (FIG. 4). In detail the following meanings are assigned as shown in FIG. 7:

A  no impulse during the entire half signal element, whereby "no impulse" is interpreted as double logic "0".

B  an impulse of half the duration of the half signal element, beginning at the start of the half signal element; this is used to represent logic "1".

C  an impulse of half the duration of the half signal element, beginning in the middle of the half signal element; this is used to represent logic "0".

D  an impulse of almost the whole duration of the half signal element; this is interpreted as double logic "1" and serves to identify an initiating communicator (IKP) during data transmission. Such an impulse is also referred to as a "double length start bit" in the following description. The rising edge of this start bit is used to synchronise the receiver time base. With the appearance of the start bit at a receiving communicator (EKP), it waits until the beginning of the second half period tc to transmit the echo.

Figure 8:
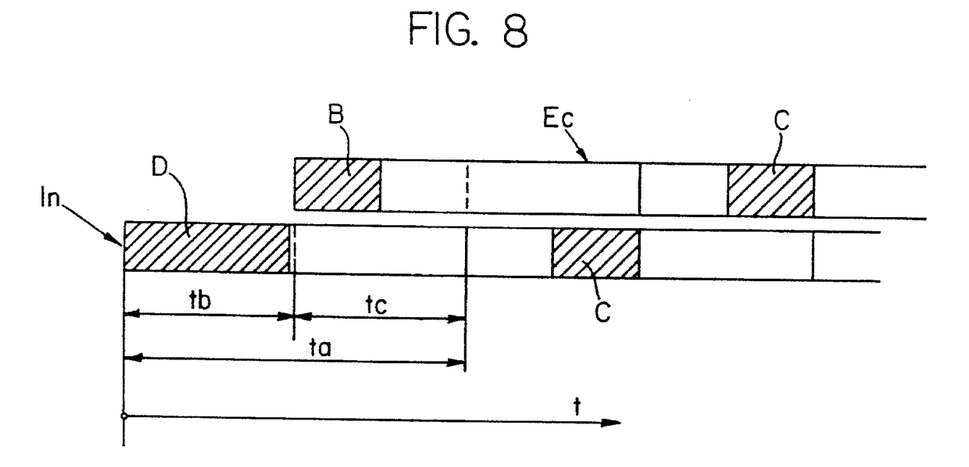
FIG. 8 is a diagram showing a datastream and an echo of this datastream.

In FIG. 8 the transmitted datastream from an initiating communicator is marked "In" and the datastream sent back as echo in the opposite direction by the receiving communicator is marked "Ec". A double length start bit D in the datastream In is answered with an echo in the form of a single length start bit B, whereas a data bit C (logic "0" for example) is sent back as an echo data bit C.

Figure 9:
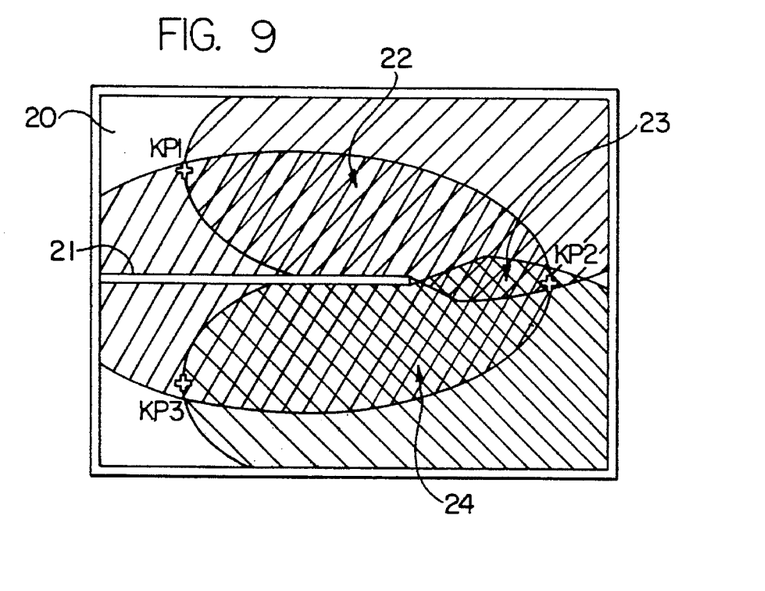
FIG. 9 is a representation of the transmit and receive conditions of several communicators located within a physical space.

FIG. 9 serves to clarify the "space problem" in the case of cable-less close connection between several communicators. As shown in FIG. 9, an enclosed space 20 with a partial inner wall 21 is assumed, in which several communicators KP1, KP2, KP3 are situated. The first and third communicators KP1 and KP3 are separated by the inner wall 21, while the second communicator KP2 is positioned approximately in line with the partial wall 21. With this arrangement three overlapping zones 22, 23 and 24 result for the transmit and receive conditions. In the second zone 23 overlapping between all three communicators KP1, KP2 and KP3 occurs, while in the first and third zones 22 and 24, overlapping only occurs between two communicators (KP1/KP2 or KP2/KP3 respectively).

It is now assumed that the first communicator KP1 is initiating (IKP), and so sends a double length start bit (D, FIGS. 7 and 8). As it lies in the first common zone 22, the second communicator KP2 receives the double start bit, marks itself as a receiving communicator (EKP) and broadcasts immediately afterwards an echo in the form of a single length start bit (B, logic "1", FIGS. 7 and 8). This is the Loop_back mode, whereby the echo is transmitted in the unused time tc (FIGS. 6 and 8). The third communicator KP3 could not receive (hear) the double length start bit from the initiating communicator IKP because of the wall 21. Because of the third common zone 24, it does however receive the single length start bit from the second communicator KP2, becoming as a result a receiving communicator (EKP) but broadcasting no echo, due to the single length (echoed) start bit. In this way the third communicator KP3 "knows" that a connection is in existence (carrier sense) and does not transmit.

On the other hand, if for another transmission the second communicator KP2 is initiating (IKP) and sends a double start bit, this is simultaneously received (heard) by the first and third communicators KP1 and KP3 because of the second common zone 23. Both then identify themselves as EKPS and send back a single length start bit as an echo. As is described in more detail later in the functional description, an initiating or receiving communicator is identified by the setting of corresponding stores (not shown) in the control unit, e.g. in the form of flip-flops.

Owing to the immediate repetition of data in the following half signal element (tc, FIGS. 6 and 8) and the condition that each communicator listens for at least two complete signal element durations before starting to transmit, it can generally be ensured that only one communicator ever transmits.

If however two communicators begin attempts to transmit quasi simultaneously, the immediate echoing of the data (Loop_back mode) again ensures that the communicators that are sending simultaneously can check in the second half of the signal element whether the information transmitted does in fact correspond to the information received (Test_mode). If there is no other communicator present, the two transmitting communicators hear no error on the return channel despite the collision, as both are now identified as IKPs and cannot send an echo. An initiating communicator, then, cannot determine whether (a) there is no other communicator in the present transmit/receive zone, or (b) a collision has in fact occurred. The following procedure is therefore followed: if a transmitting communicator does not receive in the arbitration phase the same data as it has broadcast (i.e. a different echo or no echo at all), it must then immediately terminate its transmission, in accordance with the CSMA/CA protocol, and only begin once again when it has ensured (on the basis of the "carrier sense" mechanism) that no other communicator is transmitting.

Should there only be two communicators in the current send/receive zone of a network whose configuration is dynamic (e.g. with mobile participants), there is a change over from the CSMA/CA protocol to the CSMA/CD protocol: if both communicators begin to transmit data simultaneously, then by definition both communicators become IKPs. As neither hears an echo, both must terminate transmission according to the above rule. In this way neither communicator can override the other, which corresponds to a CSMA/CD method. The following mechanism, using different wait times, is therefore used to ensure that both communicators do not both start to transmit again simultaneously: The addresses of the communicators are used to determine the wait times. As the address area can be very large, it would be necessary to deal with relatively long wait times (until a second attempt at access could be made) in the case of long communicator addresses and a base wait time multiplied by the address. For this reason the selection strategy of the bisection algorithm is set out as follows:

> For the second attempt each communicator that has a logic "1" as the last bit of its own address begins a unit of time later, while each that has a logic "0" as the last bit of its address attempts access immediately. For the next attempt the second last bit of the addresses is used, and for further attempts that may be necessary the determining bit is further shifted until the highest address bit is reached. If with this last attempt still no answer is received, it must therefore be concluded that there is no other communicator in the send/receive zone and therefore no communication can take place at all. The selected base time unit for the wait time must be longer than the dead time of the system.

Figure 10:
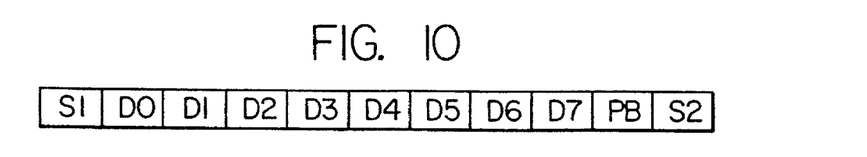
FIG. 10 is a graphic representation of a definition of a character to be transmitted.

In the character definition shown in FIG. 10, S1 means the start bit of a character, D0–D7 are data bits, PB is the parity bit and S2 is the stop bit, as per the existing state of the art.

Figure 11:
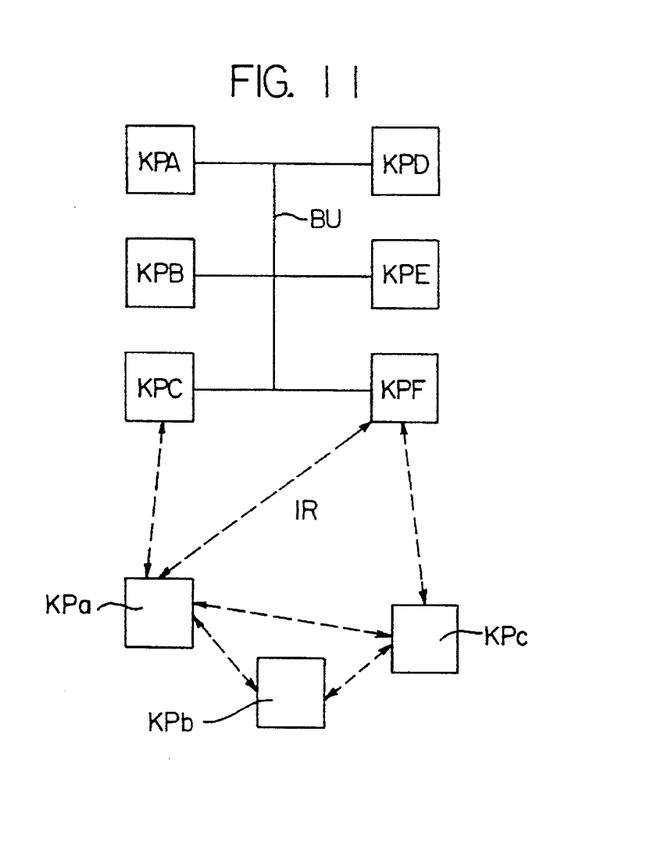
FIG. 11 represents a communication network with several hardwired and also non-hard-wired, mobile communicators.

On FIG. 11, six communicators KPA to KPF are shown, connected together via a bus BU and forming a hard-wired communication network. Mobile communicators KPa, KPb and KPc are in contact with the hard-wired communication network and each other via infra-red light or radio, and form a non-hard-wired network. They can therefore be out of reach, or reached in different places. In this sort of combined network it is therefore not possible to determine in advance with which other communicators in the wired network a mobile communicator will want to, or be able to connect with via the non-hard-wired network portion at a given point in time. In particular it also does not know the addresses of communicators in the wired network with which it could possibly make contact. It must also not send a message simultaneously to several communicators, as otherwise all of these communicators would pass on this data to the target communicator via the wired network, which would lead to an unacceptably large and unnecessary load on the bus.

For this reason a service function is provided, with which the address of a potential communicator can be ascertained (General request). Such a service function must be clearly distinguishable from useful data exchange, and must in its turn be limited to the communicators to be found in the current transmit/receive zone of the initiating, mobile communicator. For this—or other—service functions the signal alphabet element A (FIG. 7) is used in the first transmitted data bit of a character, with which the transfer to a service function (service channel) is indicated. The ensuing transmitted information does not belong to the actual datastream to be transmitted. In this way up to 128 different service commands can be transmitted with the seven remaining data bits D1–D7 of the transmitted character following the signal element A (FIG. 10). These commands only have validity locally for the receiving communicator(s) and are not passed further on. With such a command the desired address of potential communicators can be ascertained according to the rules of the CSMA/CA protocol. In addition, logical addresses for certain applications (for example) can be ascertained, so that a mobile communicator can carry out a location-dependent function according to its location, i.e. no bit combination within a normal datastream can unintentionally trigger a service function or vice versa. This is possible because the two types of modulation are selected to be orthogonal to each other. The method of operation of the apparatus described above is explained in more detail below. In the state diagrams FIG. 12 (modulator) and FIG. 13 (receive part) the various states are identified with Z0, Z1, Z2 etc. and the transitions with T0, T1, T2 etc.

The transmit and receive parts 10 and 11 respectively, and also the state machine 12 work in a handshaking system (see also FIG. 4). The transmit part 10 indicates with the BS signal (bit to send, request) to the state machine that a start bit has actually appeared on the signal Input_TxD and now the bits of the incoming signal are ready for transmission. The state machine 12 indicates with the S_Bit signal (send bit, command) to the transmit part 10 that it is now the correct time for transmitting the bit. In the same way the receive part 11 indicates with the BR signal (bit received) to the state machine 12 that it has received a start bit from the receiver 3 via the line In_RxD. The state machine 12 controls the actual reception time of the next bit to be received with the R_Bit signal (receive a bit).

If a communicator needs to transmit and has not received a bit, it waits for two signal elements before it begins to transmit and listens during this time to check if the transmission medium is already occupied (carrier sense). Then it indicates, with the setting of a flip-flop (not shown), that it is an initiating communicator IKP. The operating mode "Test" is entered simultaneously. Now it sends a double length start bit D and switches from transmit to receive at the end of the first half signal element tb (FIG. 8), after which it waits for the second half signal element tc. During this time it receives an echo in the form of a single length start bit B (FIG. 8). During the ensuing transmission of the remaining bits of the relevant character, these are continuously compared with the returning echo, and transmission is broken off after a mismatch. After the end of data transmission (no further transmit requirement) the identification "IKP" is removed from the communicator by resetting the flip-flop.

Figure 12:
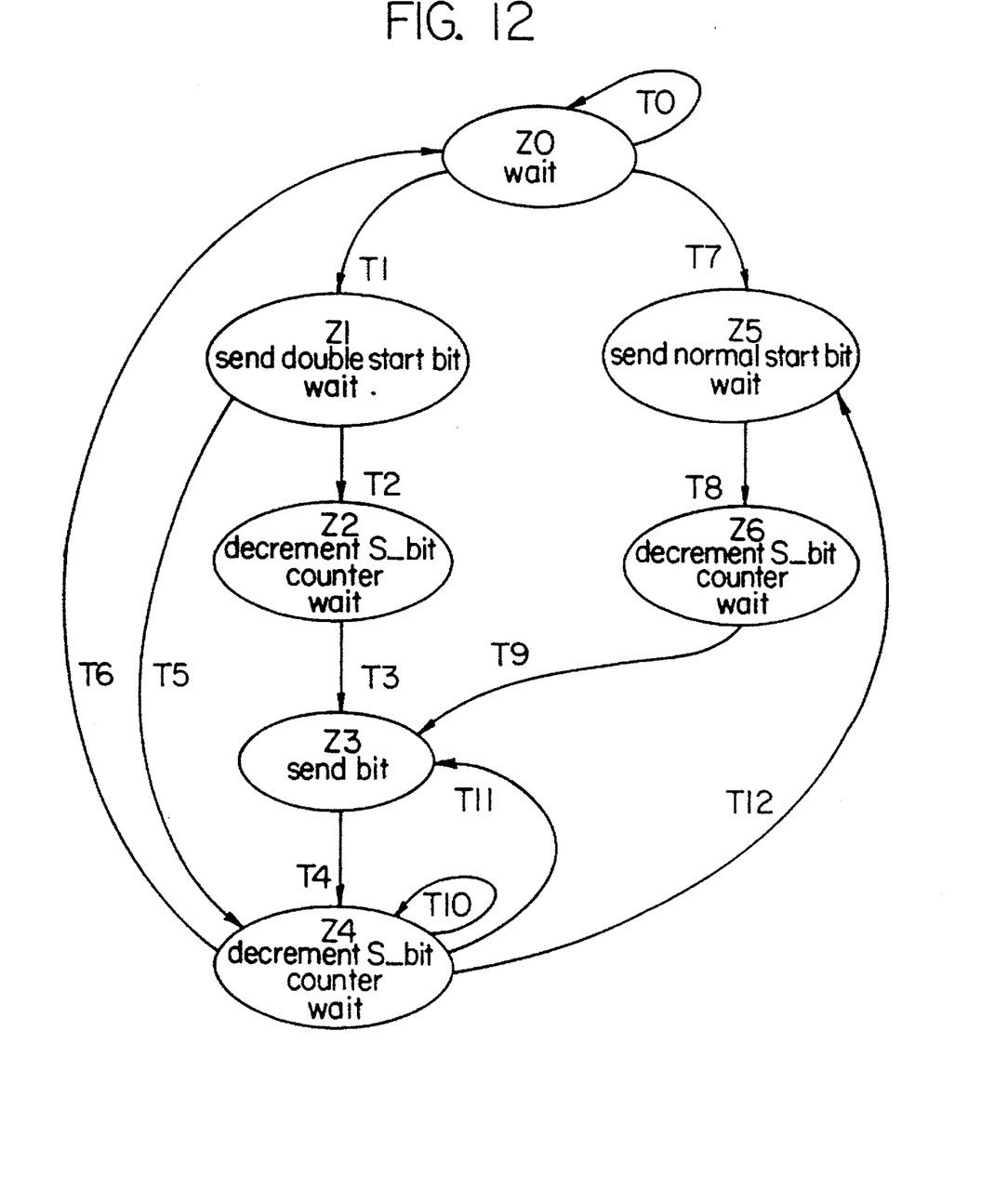
FIG. 12 is a state diagram of the state machine for a modulator in the control unit.

By means of FIG. 12 the transmission process is further explained. Here the modulator 10.2 is in the initial state, i.e. Z0. As soon as there is a bit to send, this is indicated to the modulator 10.2 by the state machine 12, whereby the system changes to state Z5 or Z1 depending on the type of communicator (EKP or IKP), and a single or double start bit respectively is broadcast. Via T8 or T2 respectively the system reaches state Z6 or Z2 respectively, where an S_Bit counter (not shown) is decremented. The system then waits. After the jump via T9 or T3 respectively the current bit is sent in state Z3, either immediately (if a logic "1" is to be represented) or after a wait time of half the duration of the half signal element (in the case of a logic "0"). The S_Bit counter is decremented in state Z4 after the transition T4 (falling edge of S_Bit), and the system then waits again. After this wait time the next bit can be sent (T11, Z3). At the end of a character the system waits during the transmission of two pseudo-bits (for synchronisation purposes), if the Flow_bridge operating mode is activated in the control unit 1 (T10). During this time the output of the modulator 10.2 is blocked. If this communicator is an IKP and a new start bit arrives during this time, it changes from Z4 via T5 to state Z1, where this start bit is sent double length. If the communicator is an EKP, it changes to state Z5 via transition T12. If the start bit does not follow immediately, the system returns to state Z0 (starting point) via transition T6 (with this the flowbridge is broken).

The multiplexer (10.3) has the task of ensuring that the correct signal source is switched to the modulator 10.2, in accordance with the system configuration. Signal sources in this context can be:

1) the signal brought in via TxD (actual data stream), 2) the signal received directly from the communication link (Loop_back mode, if the communicator is an EKP and a CSMA/CA protocol is being used), and 3) optionally a device address, if the receiver is commanded to do so by a general broadcast over the communication link.

If a communicator (which does not need to transmit data) receives a bit, it identifies itself as a receiving communicator EKP by setting a further flip-flop (not shown). If the bit is a double length start bit D and the operating mode "Loop_back" is activated, then after receipt of this double length start bit the end of the first half signal element tb is awaited, then the communicator switches from receive to transmit and sends back an echo in the form of a single length start bit B during the second half signal element tc (FIG. 8). In the same way all further bits are echoed, until the data transmission is terminated, after which the flip-flop is reset and the identification of the communicator (as EKP) is removed.

Figure 13:
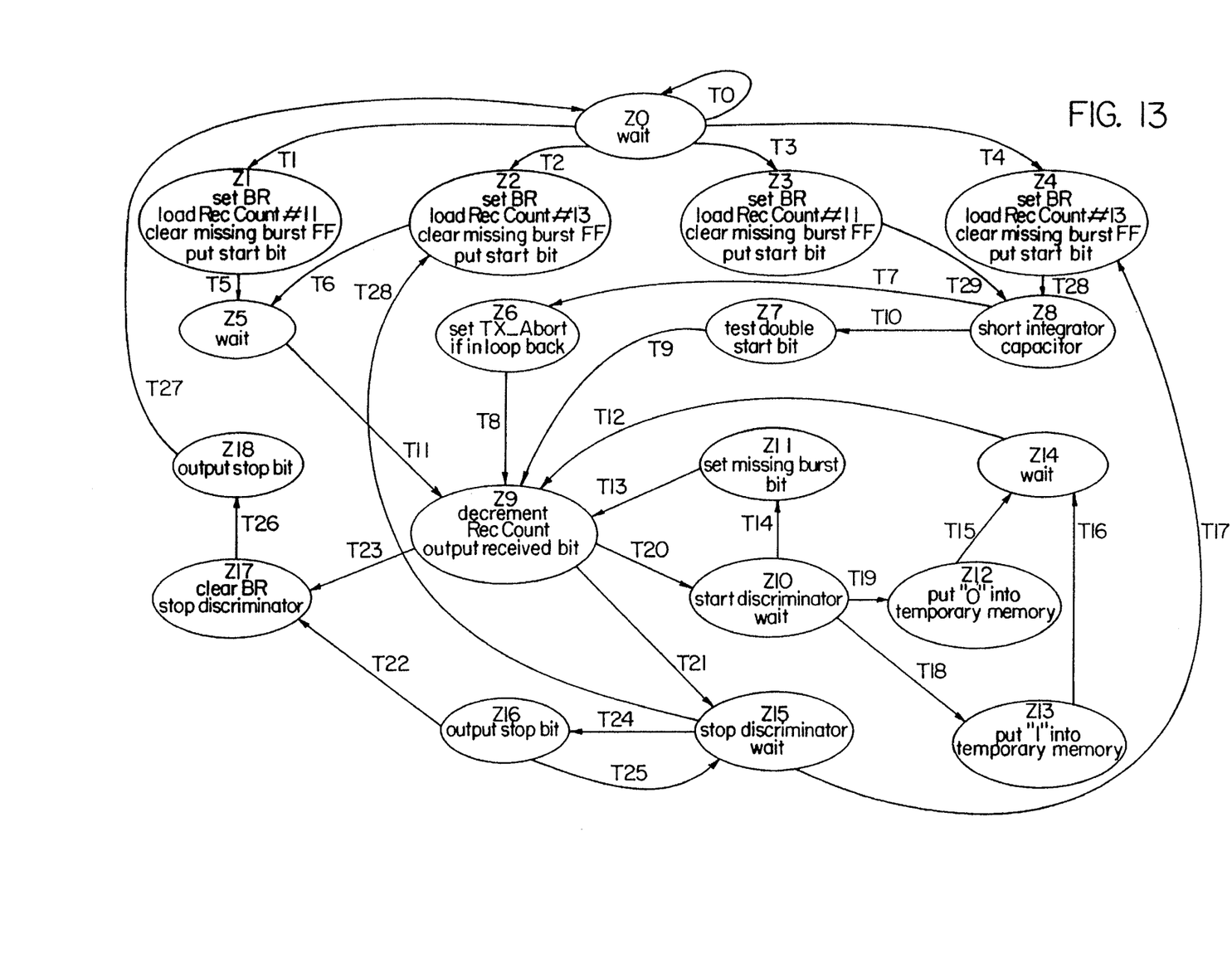
FIG. 13 is a state diagram of the state machine for a receiver part in the control unit.

The function of the receive part 11 during reception of a bit is explained in more detail with the aid of FIG. 13. The starting point is state Z0. A change of state is always triggered here by the appearance of a rising edge of a start bit that is passed from the receiver via line In_RxD. In the case where the apparatus is configured for flow-bridge operation, a receive counter (not shown) is loaded with the value 13 in the next state, otherwise it is loaded with the value 11. In both cases a flip-flop (not shown) is reset. This flip-flop signals that a burst of oscillations has not been detected during the reception of a bit. A BR flip-flop is set, which indicates to the state machine that there is a bit to receive. The start bit itself is loaded into an intermediate store (also not shown). As soon as the signal R_Bit (rising edge) is issued by the state machine 12 as handshake signal to the BR signal, the receive part 11 changes to state Z5 or Z8, depending on the current type of communicator (IKP or EKP respectively). If the communicator is an IKP, it waits in state Z5. If on the other hand it is an EKP, it now resets the In_RxD signal in state Z8 by pulsed discharge of a capacitor (not shown), and then waits. If before the end of the half signal element (indicated by the falling edge of the R_Bit signal) the capacitor is recharged by a burst of oscillations, this is signalled by a rising edge on the In_RxD signal. In this case a double length start bit would have been recognised, which leads to a change to state Z7, where the system waits for the end of the half signal element. The communicator in this situation has to send back the signal immediately in Loop_back mode as an echo. This corresponds to a direct connection from the EKP to the IKP.

If it has however not received a pulse on In_RxD (single length start bit) by the end of the half signal element, it has detected the start bit of an EKP and therefore may not send back an echo signal. The transmitter must therefore be blocked. This happens by changing to state Z6. The criterion for reaching this state (T7) is the appearance of a falling edge on signal R_Bit, which marks the end of the half signal element, before signal In_RxD appears. If a rising edge on signal In_RxD has been recognised, then a change into state Z7 follows where the end of the half signal element is awaited. T8 is an immediate jump after the blocking of the transmitter in loopback mode.

In state Z9 the receive counter is decremented, the received bit is issued and the next half signal element for reception is awaited. This point in time is indicated by the state machine 12 via the R_Bit signal, which causes transition T20 to state Z10. In this state a discriminator counter (not shown) is initialised. If during the first half of the half signal element a rising edge on signal In_RxD is now detected, an intermediate store is then set to logic "1" and then the end of the half signal element is awaited (Z10, T18, Z13, T16, Z14). Should the discriminator counter count out the half duration of the half signal element and only then the rising edge of signal In_RxD appears, then logic "0" is written into the intermediate store (Z10, T19, Z12, T15, Z14). If the In_RxD signal has also not appeared during the second half of the half signal element (end of signal element appears, before the discriminator counter is stopped by the signal In_RxD), state Z10 is left via T14 and the expected, but missing, burst of oscillations is marked by the setting of a flip-flop in state Z11. The rising edge of this signal can indicate "error signal" to the outside world. The comparison of the rising edge with the actual bit to be received can however also be used for the detection of the fourth signal alphabet element. The states Z14 and Z11 are left at the end of the half signal element, and there then follows a jump to state Z9. There the bit, to be found in the intermediate store, is issued and the receive counter is decremented. In these loops (Z9, Z10, Z12 or Z13, Z14, or Z11, Z9), the other bits are received in a similar manner. When the last bit has been received and the communicator is configured in the flow-bridge mode, it changes via T21 to state Z15, where the discriminator is stopped. Now there are two bridging pseudo-bits to be "received", and should a new start bit be received during this time, there is then another change to the corresponding state Z2 or Z4 (T17 or T28). If a start bit does not arrive during this time, it is assumed that not only the end of the character but also the end of the message has been received, and that with this the communicator can return to the original state, where it can identify its type of communicator (EKP, IKP) afresh according to the prevailing situation. This transition occurs via T22, Z17 (where the BR signal is reset), T26, T18 (stop bit is issued) and T27.

Although infra-red light has been assumed for the mobile communicators' transmission medium in the example explained above, it is clear without further explanation that the same method and in principle the same equipment can be used with radio transmission (obviously with the corresponding transmitters and receivers). The proposed method can however also be used with other transmission media which (like fibre optic cables, for example) are suited only for half-duplex operation, not full-duplex.

I claim:

1. A method for half duplex bi-directional communication of data, whereby information is transmitted by using a protocol implemented between first and second communicators (KP1, KP2), each comprising a transmitter and a receiver, and whereby the transmission of data is in serial bit form with the time between successive data bit transmission being a period $t_a$ and the direction of data signal transmission therebetween is switchable, comprising the steps of:

generating transmit identification signals by which said first communicator identifies itself as a massage initiating communicator (IKP) prior to transmitting a bit of a data signal;

generating receipt identification signals by which said second communicator identifies itself as a message receiving communicator (EKP) after receipt of a transmitted bit of a data signal;

broadcasting from said first communicator (IKP) a double length start bit (D) representing said first communicator identity at the beginning of each character of the data transmission;

waiting, by said first communicator, a defined time ($t_c$) having about one half the duration of said $t_a$ time period;

sending, by said second communicator (EKP) back an echo signal in the form and duration of a single length start bit (B) during the defined time ($t_c$) only after the of the double length start bit (D);

waiting, by the first communicator, for an echo signal after each transmitted data bit of a character;

comparing, by the first communicator, each transmitted data bit with the received echo bit;

breaking off transmission should a mismatch occur between said transmitted data bit and the received echo bit; and generating signals to remove identification of said first and second communicators as initiating (IKP) and receiving (EKP) communicators.

2. The method according to claim 1, wherein a communicator which is not in a receive zone of an initiating communicator (IKP) but is however in a receive zone of a receiving communicator (EKP), further comprising the steps of receiving an echoed single length start bit (B) and thereby itself becomes a receiving communicator (EKP), interpreting the single length start bit (B) as coming from a receiving communicator (EKP) and refraining from sending back an echo bit.

3. The method according to claim 1, further comprising the steps of transmitting the bits in the form of impulses, and modulating said bits with a combination of pulse position modulation and pulse width modulation.

4. The method according to claim 3, further comprising the steps of forming the impulses from the envelopes of bursts of oscillations.

5. The method according to claim 3, further comprising the steps of:

transmitting, at the start of the first half period (tb), an impulse (B) signal for the representation of a logic "1" half as long as one half (tb) of a time period (ta) between the transmission of bits;

transmitting, beginging in the middle of the first half period (tb) an impulse (C) signal for the representation of a logic "-O" half as long as one half (tb) of the time period (ta) between the transmission of bits;

transmitting an impulse (D) signal which is virtually as long as the half period (tb) of the aforementioned time period (ta), interpreted as a double logic "1"; and transmitting no impulse (A) signal during the duration of the half period (tb) of the time period (ta) interpreted as a double logic "O".

6. The method according to claim 5, further comprising the steps of each communicator listening for at least two time periods (ta) before beginning to transmit.

7. The method according to claim 5, further comprising the steps of interpreting, if no impulse (A) is sent as the first transmitted data bit (DO) of a character, as a transition to a service function, whereby service commands are transmitted using the following data bits (D1–D7).

8. The method according to claim 1, whereby two communicators are situated in a current transmit/receive zone and are identified with addresses, and if both of these communicators begin to transmit simultaneously, said method further comprising the steps of:

terminating transmission from both of said communicators waiting a defined time, and using the addresses of the communicators to determine the point in time at which to begin repeated transmission by said communicators.

9. The method according to claim 8, wherein, for a second attempt at transmission, said method further comprises the steps of:

transmitting first for each communicator that has a logic "0" as the last address bit, transmitting second for each communicator that has a logic "1" as the last address bit a unit of time later, and transmitting thereafter the next higher address bit is used until the highest address bit is reached.

10. The method according to claim 1, further comprising the steps of identifying the initiating communicator (IKP) and the receiving communicator (EKP) by the setting of a memory element respectively associated with each communicator.

11. Apparatus for half duplex bidirectional data communication with a direction of data signal transmission which is switchable and the transmission of data is in serial bit form with the time between successive data bit transmission being a period $t_a$, said apparatus including first and second communicators (KP1, KP2), both comprising:

a transmitter for transmitting data signals in response to transmission control signals;

a receiver for receiving said data signals in response to receiver control signals, and a control unit connected to the transmitter and the receiver for generating said transmitter and receiver control signals and having a first memory element for identification as an initiating communicator (IKP) and a second memory element for identification as a receiving communicator (EKP); said control unit receiving a first input (Test) signal and a second input (Loop back) signal such that said first input (Test) is connected to said first memory element, and said second input (Loop back) is connected to said second memory element said control unit further including a means for generating transmit identification signals by which said first communicator identifies itself as a message initiating communicator (IKP) prior to transmitting a bit of a data signal;

a means for generating receipt identification signals by which said second communicator identifies itself as a message receiving communicator (EKP) after receipt of a transmitted bit of a data signal;

a means for broadcasting from said first communicator (IKP) a double length start bit (D) representing said first communicator identity at the beginning of each character of the data transmission;

a means for waiting, by said first communicator, a defined time ($t_c$) having about one half the duration of said time period $t_a$;

a means for sending by said second communicator (EKP) back an echo signal in the form and duration of a single length start bit (B) during the defined time ($t_c$) only after the reception of the double length start bit (D);

a means for waiting, by the first communicator, for an echo signal after each transmitted data bit of a character;

a means for comparing, by the first communicator, each transmitted data bit with the received echo bit;

a means for breaking off transmission should a mismatch occur between said transmitted data bit and the received echo bit; and a means for generating signals to remove identification of said first and second communicators as initiating (IKP) and receiving (EKP) communicators.

12. Apparatus according to claim 11, wherein said control unit is connected to the transmitter via one signal (Out TxD) and to the receiver via a second signal (In RxD); each of said communicators further comprising an oscillator connected to said control unit; a voltage level shifter connected to said control unit via a third signal (Input_TxD) and a fourth signal (Output RxD), said voltage level shifter receiving the data signal to be transmitted via a fifth signal (TxD) and outputs the data signal via a sixth signal (RxD).

13. Apparatus according to claim 12, wherein said control unit further comprises a transmit part, a receive part and a state machine, which are connected to each other; the transmit part further having a modulator and a multiplexer whereby the state machine generates signals to coordinate the interaction of the transmit part and the receive part during transmission and reception.

* * * * *